United States Patent [19]
Candor

[11] Patent Number: 4,551,924
[45] Date of Patent: Nov. 12, 1985

[54] ELECTROSTATIC METHOD FOR TREATING MATERIAL

[76] Inventor: James T. Candor, 5440 Cynthia La., Dayton, Ohio 45429

[21] Appl. No.: 624,006

[22] Filed: Jun. 25, 1984

Related U.S. Application Data

[60] Continuation of Ser. No. 548,646, Nov. 4, 1983, abandoned, which is a continuation of Ser. No. 401,078, Jun. 23, 1982, abandoned, which is a division of Ser. No. 386,703, Jun. 9, 1982, abandoned, which is a continuation-in-part of Ser. No. 319,114, Nov. 9, 1981, Pat. No. 4,404,754, which is a continuation-in-part of Ser. No. 261,784, May 8, 1981, Pat. No. 4,338,729, which is a division of Ser. No. 124,224, Feb. 25, 1980, Pat. No. 4,283,862, which is a division of Ser. No. 50,807, Jun. 2, 1979, Pat. No. 4,208,807, which is a continuation-in-part of Ser. No. 925,378, Jul. 17, 1978, abandoned, which is a division of Ser. No. 863,910, Dec. 23, 1977, Pat. No. 4,111,773, which is a continuation-in-part of Ser. No. 732,646, Oct. 15, 1976, Pat. No. 4,081,342, which is a continuation-in-part of Ser. No. 695,068, Jun. 11, 1976, Pat. No. 4,033,841, which is a continuation-in-part of Ser. No. 569,815, Apr. 21, 1975, Pat. No. 3,966,575, which is a continuation-in-part of Ser. No. 499,178, Aug. 21, 1974, Pat. No. 3,893,898, which is a continuation-in-part of Ser. No. 383,255, Jul. 27, 1973, Pat. No. 3,849,275, which is a division of Ser. No. 263,605, Jun. 16, 1972, Pat. No. 3,795,605, which is a continuation-in-part of Ser. No. 53,402, Jul. 9, 1970, abandoned, which is a continuation-in-part of Ser. No. 25,938, Apr. 6, 1970, Pat. No. 3,687,834, which is a continuation-in-part of Ser. No. 864,851, Oct. 8, 1969, abandoned, which is a continuation-in-part of Ser. No. 811,421, Mar. 28, 1969, abandoned.

[51] Int. Cl.⁴ .................. F26B 3/34; B01D 57/02
[52] U.S. Cl. ............................... 34/1; 204/183.1
[58] Field of Search ............... 34/1; 204/180 R, 300 R

[56] References Cited

U.S. PATENT DOCUMENTS

| | | | |
|---|---|---|---|
| 2,042,145 | 5/1936 | Darrah | 34/24 |
| 3,633,282 | 1/1972 | Candor et al. | 34/1 |
| 4,081,342 | 3/1978 | Candor | 204/180 R |
| 4,359,826 | 11/1982 | Rounsley | 34/1 |

FOREIGN PATENT DOCUMENTS 0036632 9/1981 European Pat. Off. .

Primary Examiner—John J. Camby
Attorney, Agent, or Firm—Candor, Candor & Tassone

[57] ABSTRACT

A method and/or apparatus for drying material is provided, the method comprising the steps of disposing the material in a heating unit to have the heating unit heat at least part of the liquid particles of the material, disposing a charged electrode unit so as to be adjacent one side of the material when the material is disposed in the heating unit and to define a plurality of alternately directed electrostatic fields that are serially arranged in a like repeating pattern and that are substantially constant and non-oscillating so that the fields at least partially extend through the material while the material is disposed in the heating unit, and moving the material in one direction through the heating unit to cause at least a portion of the material to have the particles of liquid thereof serially moved through a field that tends to move those particles in one direction relative to the material and then into the next field that tends to move those particles in substantially an opposite direction relative to the material in a repetitive manner whereby the particles of liquid of the portion of the material are subjected to an alternately directed pumping action by the serially arranged fields while the portion of the material is being heated by the heating unit and the material is being moved through the heating unit in the one direction.

22 Claims, 14 Drawing Figures

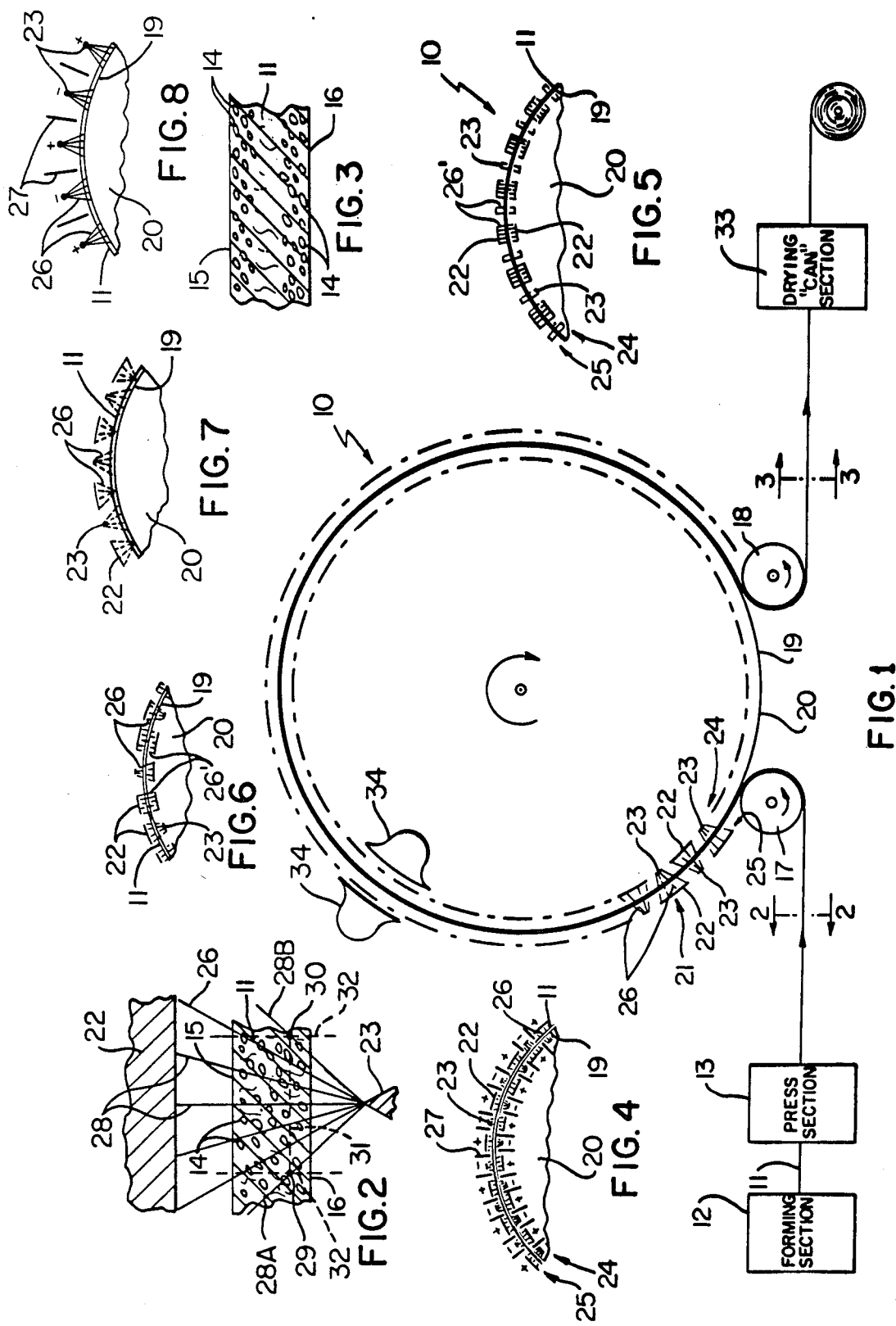

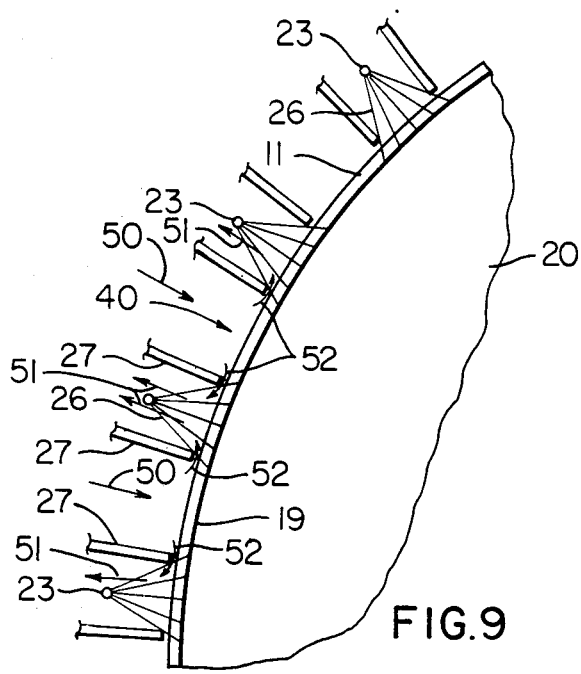
FIG.9
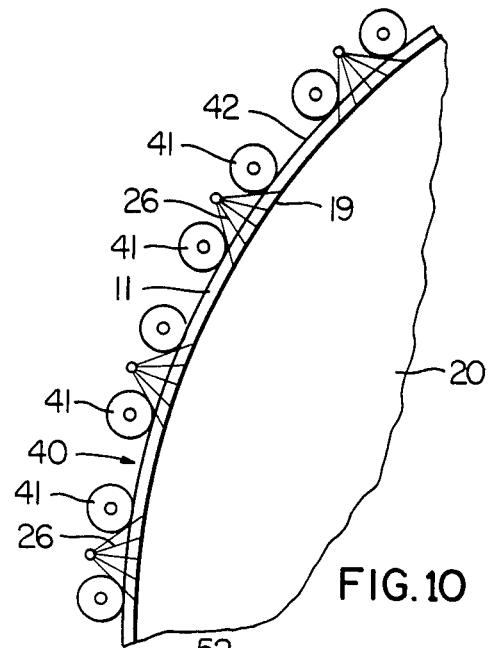
FIG.10
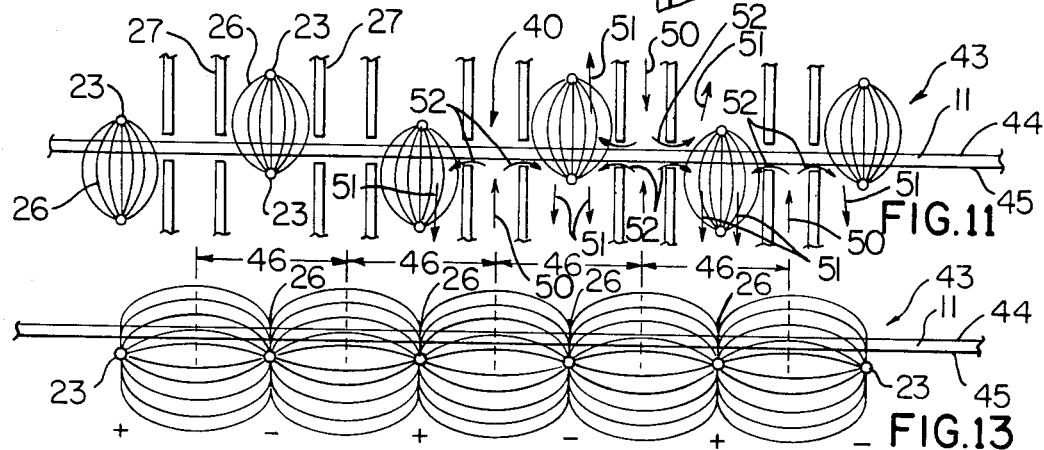
FIG.11
FIG.13
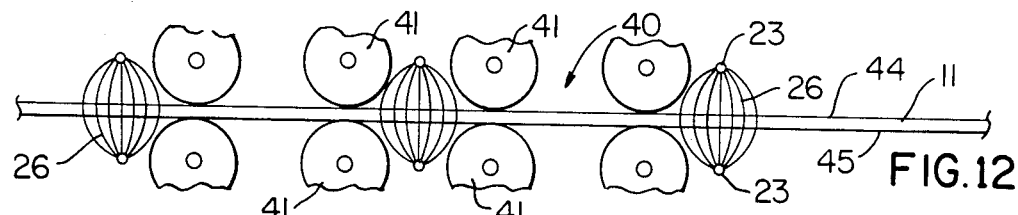
FIG.12
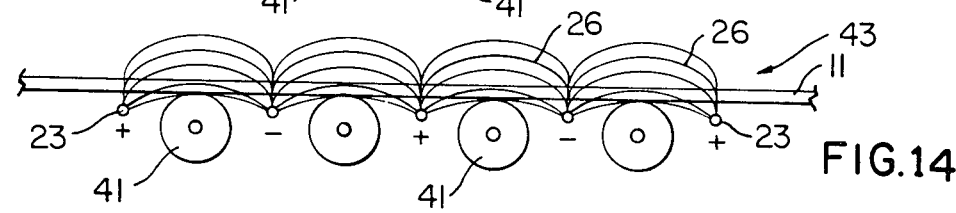
FIG.14

ELECTROSTATIC METHOD FOR TREATING MATERIAL

This application is a continuation patent application of its copending parent application, Ser. No. 548,646, filed Nov. 4, 1983, now abandoned in favor of this continuation application and, which, in turn, is a continuation patent application of its copending parent application Ser. No. 401,078, filed June 23, 1982, now abandoned, and, which, in turn, is a divisional patent application of its copending parent patent application, Ser. No. 386,703, filed June 9, 1982, now abandoned, which, in turn, is a continuation-in-part (CIP) application of its copending parent application, Ser. No. 319,114, filed Nov. 9, 1981, now U.S. Pat. No. 4,404,754, which, in turn, is a CIP application of its copending parent patent application, Ser. No. 261,784, filed May 8, 1981, now U.S. Pat. No. 4,338,729, which, in turn, is a divisional application of its copending parent patent application, Ser. No. 124,224, filed Feb. 25, 1980, now U.S. Pat. No. 4,283,862, which, in turn, is a divisional application of its copending parent application, Ser. No. 050,807, filed June 2, 1979, now U.S. Pat. No. 4,208,807, which, in turn, is a CIP application of its copending parent application, Ser. No. 925,378, filed July 17, 1978, now abandoned, which, in turn, is a divisional patent application of its copending parent patent application, Ser. No. 863,910, filed Dec. 23, 1977, now U.S. Pat. No. 4,111,773, which, in turn, is a CIP application of its copending parent patent application, Ser. No. 732,646, filed Oct. 15, 1976, now U.S. Pat. No. 4,081,342, which, in turn, is a CIP application of its copending parent application, Ser. No. 695,068, filed June 11, 1976, now U.S. Pat. No. 4,033,841, which, in turn, is a CIP application of its copending parent application Ser. No. 569,815, filed Apr. 21, 1975, now U.S. Pat. No. 3,966,575, which, in turn, is a CIP application of its copending parent application, Ser. No. 499,178, filed Aug. 21, 1974, now U.S. Pat. No. 3,893,898, which, in turn, is a CIP application of its copending parent patent application, Ser. No. 383,255, filed July 27, 1973, now U.S. Pat. No. 3,849,275, which, in turn, is a divisional application of its copending parent patent application, Ser. No. 263,605, filed June 16, 1972, now U.S. Pat. No. 3,795,605, which, in turn, is a CIP application of its copending parent patent application, Ser. No. 53,402, filed July 9, 1970, abandoned in favor of said application Ser. No. 263,605 and which, in turn, is a CIP patent application of its copending parent application, Ser. No. 25,938, now U.S. Pat. No. 3,687,834, filed Apr. 6, 1970, which, in turn, is a CIP of its copending parent patent application, Ser. No. 864,851, filed Oct. 8, 1969, now abandoned which, in turn, is a CIP patent application of its copending parent patent application, Ser. No. 811,421, filed Mar. 28, 1969, and now abandoned, that aforementioned Ser. No. 569,815, in part also discloses and claims subject matter disclosed in the earlier filed pending application, Ser. No. 548,666, filed Feb. 10, 1975, now U.S. Pat. No. 3,965,581, which, in turn, is a CIP application of its copending parent application, Ser. No. 469,820, filed May 14, 1974, now U.S. Pat. No. 3,931,682, as well as a CIP application of copending Ser. No. 405,023, filed Oct. 10, 1973, now U.S. Pat. No. 4,060,449, and Ser. No. 499,178, filed Aug. 21, 1974, now U.S. Pat. No. 3,893,898.

This invention relates to an improved electrostatic method and apparatus for treating material, such as for electrostatically removing retained liquid from web-like liquid bearing material of the liquid absorbing type.

It is well known from applicant's aforementioned U.S. Pat. No. 3,966,575 and its chain of related patent applications and issued patents that it is believed that liquid in liquid bearing material of the liquid absorbing type can be moved relative to that material when the liquid bearing material is passed through a plurality of non-uniform electrostatic fields with each field having the higher intensity portion thereof substantially oppositely located relative to the higher intensity portion of an adjacent non-uniform field so that the fields at least partially extend through the material to act on at least part of the retained liquid thereof to move at least part of the retained liquid relative to the material.

It is a feature of the aforementioned parent U.S. Pat. No. 4,033,841, to illustrate, describe and claim the above liquid moving feature in combination with a conventional method and apparatus of removing retained liquid from web-like liquid bearing material of the liquid absorbing type as the material is being substantially continuously moved therein to improve upon such conventional method and apparatus.

In particular, it is believed that the alternately arranged non-uniform electrostatic fields of this invention will move the moisture particles in the liquid bearing material in such a manner that the liquid particles will be arranged closely adjacent the outer surfaces of the liquid bearing material so that the subsequent engagement of those outer surfaces with the conventional liquid vaporizing equipment will cause a more rapid removal of such liquid particles as the same are concentrated adjacent the outer surfaces thereof rather than dispersed throughout the same as in the conventional methods and apparatus.

Such feature of concentrating the liquid particles adjacent the outer surfaces of the wet web of material is known as the "bonus effect" in the web drying art.

For example, see the December 1974 "Journal of the Technical Association of the Pulp and Paper Industry" (TAPPI) volume 5, No. 12, at page 134 wherein an article entitled "An Updated Review of Dielectric Heating in the Paper, Pulp and Board Industry" by T. L. Wilson, indicates that the dielectric heating of the liquid particles in a wet web of material causes the center particles to rapidly explode into steam and entrain the other liquid particles to move the same closer to the outer surfaces of the wet web of material so that such moved moisture particles will be more readily subsequently removed by conventional vaporizing equipment and thereby the dielectric heating operation produces the "bonus effect" in a manner similar to the feature of this invention as theorized above.

Accordingly, one embodiment of the invention in the aforementioned parent U.S. Pat. No. 4,033,841, provides means for creating a plurality of non-uniform electrostatic fields with each field having the higher intensity portion thereof substantially oppositely located relative to the higher intensity portion of an adjacent non-uniform field and means for passing a continuously moving web-like material through the fields so that the fields at least partially extend through the material to act on at least part of the retained liquid thereof to move at least part of the retained liquid relative to the material, such embodiment of that invention being utilized in a conventional method or apparatus that is utilized for removing retained liquid from web-like liquid bearing material of the liquid absorbing type as the material is being substantially continuously moved.

However, it is a feature of the aforementioned parent application, Ser. No. 732,646, to modify such embodiment to repetitively change the electrostatic field pattern thereof to act not only on wet fibrous material being passed through such changing electrostatic field pattern, but on any desired material, such as gas, liquid, etc., passed through such changing electrostatic fields.

In particular, one embodiment of that invention provides a method and apparatus for treating material that is disposed in an electrostatic field pattern to be acted upon by the electrostatic field pattern and having means for repetitively changing the electrostatic field pattern from a substantially uniform electrostatic field pattern to a substantially non-uniform electrostatic field pattern and then back to the substantially uniform electrostatic field pattern while the field pattern is acting on the material disposed therein, the material being a wet weblike fibrous material, a fluid, etc.

It is known from the U.S. Patent to Candor et al, U.S. Pat. No. 3,641,680, that it has been suggested that the combination of vibrating action and electrostatic field action on the moisture of moisture bearing material will tend to remove such moisture from the moisture bearing material because it is believed that the vibrating action will tend to reduce the particle size of the moisture in the moisture bearing material to tend to reduce the capillary holding action of the material on the moisture therein while the electrostatic field action will tend to sweep such reduced sized moisture particles from the moisture bearing material by an electro-osmotic action. Also, see the U.S. Pat. No. 3,931,682 to Candor.

It is also known that dielectric heating is utilized to remove moisture from moisture bearing material by passing the moisture bearing material through a high-intensity, high frequency electric field such as is produced by a radio frequency generator.

In the case of dielectric heating wet fibrous webs, such as paper or pulp, it is known from the aforementioned TAPPI article, that the dielectric heating of the web of material causes the moisture particles in the center portion of the web of material to rapidly turn to steam which explodes outwardly toward the opposed sides of the web of material and carries with it other particles of liquid water that are subsequently caught adjacent the opposed surfaces of the web of material by the more dense and hard surface layers thereof which are sufficiently porous to permit the passage of vapor, but not the moved particles of moisture.

It is believed, according to the teachings of the invention of the aforementioned parent U.S. Pat. No. 3,965,581, that if the moisture particles in such web of material are reduced in size by a sonic or ultrasonic vibrating action, the dielectric heating process will be improved as the reduced size particles of moisture being swept along by the exploding central portion of steam in the web can more readily be pushed out through the denser outer layers of the web of material. Also, the dielectric heating action on the reduced sized particles more rapidly heats up the same. Also, it is believed, according to the teachings of that invention, that if an electrostatic field action is also acting on the dielectric heated material, such electrostatic field action will assist the steam action in moving the moisture particles toward the outer layers of the web of material through the force of the electrostatic field action thereon and also will tend to remove the moisture from the outer surfaces or layers of the material for the reasons previously set forth.

Accordingly, the purpose of the aforementioned continuation-in-part application, Ser. No. 863,910, is to illustrate, describe and claim a believed to be further advantage of the combination of vibratory and dielectric heating action and/or vibratory and electrostatic action as will be apparent hereinafter by incorporating vibratory action in the various embodiments of the aforementioned parent application, Ser. No. 732,646.

Thus, it is a feature of that invention to improve upon the dielectric heating action of a high frequency electric field being imposed on a strip of liquid bearing fibrous material or the like.

It is believed that this feature can be accomplished by sonically or ultrasonically vibrating at least the outer layers of the strip of material at the same time the particles of retained liquid in the strip of material are being dielectrically heated.

In particular, it is believed that when a strip of liquid bearing fibrous material is being dielectrically heated, the retained liquid particles in the center layer thereof are more rapidly heated and turned to steam than the liquid particles in the outer opposed layers thereof because the liquid particles in the outer layers dissipate their heat to the surrounding atmosphere at a rate that increases progressively the closer the liquid particles are to the outer opposed surfaces of the strip of material.

It is believed, in contrast, that the liquid particles in the outer opposed layers of the strip of material are vibrated at a greater rate than the liquid particles in the center layer thereof when sonic or ultrasonic energy is imposed against the outer opposed surfaces of the strip of material because the vibratory waves are progressively dissipated as they progressively penetrate into the strip of material.

However, it is believed according to the teachings of the invention of aforementioned patent application, Ser. No. 863,910, that by combining the dielectric heating action with a vibratory action, the vibratory action will increase the beneficial results of the dielectric heating action by:
  (1) increasing the rate of the dielectric heating of the liquid particles in the outer layers of the strip of material through the mechanical high frequency movement of those liquid particles through the field lines of force of the high frequency electric field being imposed on the strip of material.
  (2) increasing the flowing rate of steam entrained liquid particles out through the outer layers by reducing the resistance of the fibers in the outer layers to such flow.
the above two effects (1) and (2) being in addition to the beneficial effect of the heating of the liquid particles through the friction created between the vibrating liquid particles and the fibers of the material.

In particular, it is believed that the vibrating action causes the retained liquid particles to oscillate tens of thousands of times through field lines of force, at least immediately adjacent the outer opposed surfaces and with a progressively decreasing rate into the center layer of the strip of material, and if such field lines of force are angled relative to such oscillating movement, a partial oscillating rotation effect is created on the vibrating liquid particles and this oscillation coupled with the full oscillating rotation effect on the particles caused by the oscillating high frequency electric field is believed to multiply or otherwise increase the dielectric heating rate from the dielectric heating rate if the same high frequency field is utilized without the vibrating action. Such high frequency vibrating action is also believed to increase the rate of flow of the steam entrained liquid particles out of the strip of material and/or to move the entrained liquid particles closer to the outer layers to increase the "bonus effect" of the dielectric heating operation previously mentioned in connection with the aforementioned TAPPI article.

It is also believed that if the high frequency electric field lines of force are angled through the strip of material from one side thereto to the other side thereof and other than parallel between the opposed sides and other than perpendicular thereto, the oscillating effect of vibrating the retained liquid particles through such field lines of force to increase the dielectric heating of such liquid particles will be enhanced.

Thus, it is another feature of the invention of the aforementioned patent application, Ser. No. 863,910, to provide a plurality of non-uniform high frequency electric fields for the dielectric heating action and for the purpose of providing angled field lines of force through the strip of material.

In this regard, it may be found that with such non-uniform electric fields, a dielectric heating action may be created through the high frequency vibrating action on the retained liquid particles through the angled field lines of force without having the electric field also oscillating, or at least not oscillating at a high frequency rate, whereby the non-uniform fields can be static and thereby constant.

In any event, one embodiment of the invention of the aforementioned patent application, Ser. No. 863,910, provides a method and/or apparatus for dielectrically heating retained liquid in a strip of liquid bearing fibrous material of the liquid absorbing type by vibrating at least the outer opposed layers of the strip of material in an electric field arrangement whereby at least some of the retained particles of liquid in the outer layers are vibrated through the electrostatic field lines of force of the field arrangement to cause such liquid particles to be dielectrically heated by the vibrating action at a greater rate than the retained particles of liquid in the inner layers thereof.

Such electric field arrangement can comprise a high frequency electric field arrangement and/or comprise a non-uniform electrostatic field arrangement that has a plurality of non-uniform electrostatic fields with each field having the higher intensity portion thereof substantially oppositely located relative to the higher intensity portion of an adjacent field.

It is also believed that the same high frequency electric source can be utilized to operate both apparatus that respectively produces the dielectric heating action of this invention and the high frequency vibratory action of this invention so that a savings in total cost for such apparatus can be provided.

It is believed that at least some of the aforementioned features can be obtained by merely disposing an electrode arrangement adjacent an existing heated surface to augment the drying effect of the heated surface.

For example, the electrode arrangement can cooperate with the heated surface to define a plurality of alternately arranged non-uniform electrostatic fields extending between the electrode arrangement and the surface with each non-uniform field having the higher intensity portion thereof substantially oppositely located relative to the higher intensity portion of an adjacent non-uniform field so that the fields can at least partially extend through a material to be dried when the material is disposed against the surface and between the surface and the electrode arrangement.

Such heated surface could be an existing drier drum known as a "can" or "yankee" in the paper making industry and the material to be dried can be the paper webs normally being dried by such heated drums. Of course, this invention is not to be limited to the paper industry as it is believed that the features of this invention can be utilized with almost any type of drying system.

It is also believed that the aforementioned electrode arrangement for an existing dryer drum need not define a plurality of alternately arranged non-uniform electrostatic fields but that the same can define a plurality of alternately directed and oppositely charged electrostatic fields that are serially arranged with the positively charged portion of every other field at the electrode means being adjacent and between the negatively charged portions of the two fields adjacent thereto at the electrode means in a like repeating pattern.

For example, such electrode means can comprise a plurality of like electrodes disposed in an arcuate pattern outboard of the dryer drum, transverse to the direction of rotation of the dryer drum, parallel to each other and extending across the width of the web of material being dried thereby.

Of course, it is to be understood that the various features of this invention can be utilized with other types of drying systems than just with the dryer drum arrangement previously described.

For example, the electrode means of this invention can be disposed adjacent the material to be dried while the material is being heated by other heating means, such as a heating means wherein heated air is directed against the material as the same moves through the heating means.

In particular, one embodiment of this invention provides a method for drying material by disposing the material in a heating means to have the heating means heat at least part of the liquid particles of the material, the method comprising the steps of disposing charged electrode means so as to be adjacent one side of said material when said material is disposed in said heating means and to define a plurality of alternately directed electrostatic fields that are serially arranged in a like repeating pattern and that are substantially constant and non-oscillating so that said fields at least partially extend through said material while said material is disposed in said heating means, and moving said material in one direction through said heating means to cause at least a portion of said material to have the particles of liquid thereof serially moved through a field that tends to move those particles in one direction relative to said material and then into the next field that tends to move those particles in substantially an opposite direction relative to said material in a repetitive manner whereby said particles of liquid of said portion of said material are subjected to an alternately directed pumping action by said serially arranged fields while said portion of said material is being heated by said heating means and said material is being moved through said heating means in said one direction.

It is also believed according to the teachings of this invention that means can be disposed between each pair of adjacent electrostatic fields of this invention to change the normal shape of those electrostatic fields between the electrode means and the material to enhance the action of those reshaped electrostatic fields on the material being dried by the heating means utilizing such electrode means.

For example, one embodiment of the method of this invention for drying material comprises the steps of disposing the material in a heating means to have the heating means heat at least part of the liquid particles of the material, disposing charged electrode means so as to be adjacent one side of the material when the material is disposed in the heating means and to define a plurality of electrostatic fields that are serially arranged in substantially a like repeating pattern and that are substantially constant and non-oscillating so that the fields at least partially extend through the material while the material is disposed in the heating means, moving the material in one direction through the heating means to cause at least a portion of the material to have the particles of liquid thereof serially moved through the fields while the portion of the material is being heated by the heating means whereby the fields augment the drying effect of the heating means on the material, and disposing means between each pair of adjacent fields to change the normal shape of the adjacent fields between the charged electrode means and the material so that when the material is moved in the one direction, the particles of liquid of the portion serially move through the thus reshaped fields while the portion of the material is being heated by the heating means.

The means for reshaping the fields can comprise nozzle means that directs heated or unheated air or other fluid against the material and thereby can comprise at least part of the heating means.

Therefore, it is an object of this invention to provide an improved method and/or apparatus for drying material, the method and/or apparatus of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

FIG. 1 is a schematic view illustrating the improved method and apparatus of this invention.

FIG. 2 is an enlarged, fragmentary, cross-sectional view taken on line 2—2 of FIG. 1 and has one of the non-uniform fields 26 of FIG. 1 superimposed thereon.

FIG. 3 is an enlarged, fragmentary, cross-sectional view taken on line 3—3 of FIG. 1.

FIG. 4 is a fragmentary view similar to FIG. 1 and illustrates another embodiment of the method and apparatus of this invention.

FIGS. 5 and 6 are respectively fragmentary views similar to FIG. 1 and illustrate other embodiments of the method and apparatus of this invention.

FIG. 7 is a view similar to FIGS. 4–6 and illustrate another embodiment of the method and apparatus of this invention.

FIG. 8 is a view similar to FIG. 7 and illustrates another embodiment of the method and apparatus of this invention.

FIG. 9 is a view similar to FIG. 8 and illustrates another embodiment of the method and apparatus of this invention.

FIG. 10 is a view similar to FIG. 9 and illustrates another embodiment of the method and apparatus of this invention.

FIG. 11 is a view similar to FIG. 10 and illustrates another embodiment of the method and apparatus of this invention.

FIG. 12 is a view similar to FIG. 11 and illustrates another embodiment of the method and apparatus of this invention.

FIG. 13 is a view similar to FIG. 12 and illustrates another embodiment of the method and apparatus of this invention.

FIG. 14 is a view similar to FIG. 13 and illustrates another embodiment of the method and apparatus of this invention.

While the various features of this invention are hereinafter described and illustrated as being particularly adapted to provide means for removing liquid from wet fibrous material, it is to be understood that the various features of this invention may be utilized singly or in any combination thereof to remove liquid from other types of material, as desired.

Therefore, this invention is not to be limited to only the embodiments illustrated in the drawings, because the drawings are merely utilized to illustrate one of the wide variety of uses of this invention.

Referring now to FIG. 1, the improved method and apparatus of this invention is generally indicated by the reference numeral 10 and comprises a conventional paper making apparatus wherein a wet fibrous sheet 11 is formed in a conventional web-forming section 12 commonly known as a wet forming section.

The wet fibrous web 11 emerges from the wet forming section 12 and is normally passed through a press section 13 which tends to mechanically squeeze as much moisture from the wet web 11 as possible without adversely crushing the same whereby the wet web 11 of material emerging from the press section 13 still retains a relatively large amount of liquid therein which must be subsequently removed.

For example, see FIG. 2 wherein the web of material 11 is schematically illustrated in cross-section as having a plurality of liquid particles 14 dispersed throughout the same between the top surface 15 and bottom surface 16 thereof.

Normally, the wet web of material 11 passing from the press section 13 is directed to a liquid vaporizing drying section 33 which can comprise a plurality of heated cylindrical drums or "cans" around part of the periphery of which the wet web of material 11 is directed to have the moisture particles 14 thereof evaporated through the heating thereof by such steam heated "cans". Also, such drying section 33 could comprise a hot air impingement drying section wherein heated air is impinged against the opposed surfaces 15 and 16 of the wet web of material 11 to tend to vaporize the moisture particles 14 therein through the heating thereof by the heated air.

In any event, it is believed, according to the teachings of this invention, that if the wet web of material 11, between the press section 13 and the drying section 33, is passed through a plurality of alternately arranged non-uniform electrostatic fields, such electrostatic field action will act on the moisture particles 14 in the wet web of material 11 to tend to move the same from the center area thereof to areas closely adjacent the outer surfaces 15 and 16 thereof as illustrated in FIG. 3 so that when the web of material 11 enters the drying section 33, the moisture particles 14 can more readily be evaporated from the web of material 11 whereby a "bonus effect" will be produced by the non-uniform electrostatic field action of this invention.

For example, the wet web of material 11 between the press section 13 and the conventional drying section 33 can be passed by guide rollers 17 and 18 against the outer peripheral portion 19 of a rotatable drum means 20 so that the web of material 11 will be carried by the drum 20 through an arcuate path as illustrated.

A plurality of pairs 21 of large 22 and small 23 electrodes are disposed in the arcuate arrangement illustrated in FIG. 1 so that an inner row 24 of alternating large and small electrodes 22 and 23 is disposed inside the non-conductive outer periphery 19 of the drum 20 laterally across the width of the web 11 being carried thereon and an outer row 25 of cooperating and alternating small and large electrodes 23 and 22 are disposed exterior to the peripheral surface 19 of the drum 20 laterally across the width of the web 11 in the arcuate arrangement illustrated so that each pair 21 of cooperating small and large electrodes 22 and 23 define a non-uniform electrostatic field 26 therebetween when the electrodes 22 and 23 of each pair are charged with opposite potentials or with a potential differential therebetween by one of the electrodes having a greater potential than the other electrode, such as by having the other electrode grounded or with a like but lesser charge thereon.

In any case, the electrodes in the outer row 25 have a different potential than the electrodes in the inner row 24 so that a plurality of alternating non-uniform electrostatic fields 26 are arranged in an arcuate path and extend through the material 11 as the same is moved by the rotating drum 20.

The operation of the method and apparatus 10 of this invention will now be described.

It is believed that as the wet web of material 11 moves in a clockwise direction from the guide roller 17 to the guide roller 18 on the outer periphery 19 of the drum 20, the action of the non-uniform electrostatic fields 26 causes the moisture particles 14 in the web of material 11 to be moved toward the higher intensity portions thereof which are disposed adjacent the smaller electrodes 23 for the reasons advanced in the aforementioned U.S. Pat. No. 3,966,575 whereby the moisture particles 14 in the web 11 on the side 15 of the center line or at the center line thereof are driven toward the side 15 and the moisture particles 14 at and on the side 16 of the center line thereof are driven toward the side 16 thereof by the theory of dielectrophoresis.

Further, it is believed that as a moisture particle 14 in the web 11 is being repetitively moved through an intense portion of a non-uniform electrostatic field 26 and then through an untense portion of the next adjacent field 26, a pulsating pumping action is being imposed on such moisture particle 14 as it is rapidly being moved through all of the non-uniform fields 26 because the intense portion of a field 26 pulls or pushes the particle 14 outwardly toward one side of the web 11 with a greater force than the force of an untense portion of a field 26. Thus, by providing a large number of alternately arranged non-uniform fields 26 and with the normal speed of a paper making machine, such as 3,000 to 5,000 feet per minute, it can be seen that each liquid particle 14 will be subjected to a rapid outward pumping action by the fields 26 as the particle 14 moves through the circular array of fields 26 from the inlet guide roller 17 to the outlet guide roller 18.

However, as set forth in the aforementioned article, the wet web of material 11 normally has the outer layers of material thereof formed substantially denser and harder than the inner layers of material thereof so that the moved moisture particles 14 would tend to be trapped in the outer denser layers. Thus, the force of the electrostatic fields 26 may not be sufficient to actually remove the moisture particles 14 from the wet web of material 11 but it is believed that the force will cause the same to move to and gather near the outer denser surfaces 15 and 16 thereof as set forth in the aforementioned article wherein the liquid particles are driven outwardly by exploding steam within the center of the wet web of material, the steam being caused by dielectric heating of the material in contrast to this invention which causes the moisture particles to be moved solely by an electrostatic non-uniform field action.

Thus, it is believed that when the wet web of material 11 leaves the drum 20, the same will have the moisture particles 14 arranged in the manner illustrated in FIG. 3 so that the same will be more readily evaporated when the same reaches the drying section 33 than if the drum 20 and non-uniform field arrangement 26 of this invention were not utilized whereby a "bonus effect" is produced by this invention to improve upon the conventional drying methods and apparatus.

Also, it is believed that since no actual current flow occurs between the electrodes 22 and 23 in each cooperating pair 21 thereof as each non-uniform field 26 is produced by a capacitance arrangement, this "bonus effect" of this invention is believed to be most efficient as the only work required is the movement of the web 11 through the fields 26 in much the same manner that a wire is moved in a permanent magnet field to create a current flow in the wire.

While the drum 20 of this invention is illustrated and described as being located between the sections 13 and 33, it is to be understood that the same could be located anywhere in the line, as desired. For example, the drum 20 could be located in the middle of the "can" drying section 33. Also, the outer peripheral part 19 of the drum 20 could be heated to assist the electrostatic field forces in moving the liquid particles 14 relative to the material 11. For example, steam could be injected into the drum 20 to heat its outer peripheral part 19, if desired, whereby such heated drum 20 could be considered one of the "cans" of the drying section 33.

In addition, it is believed that the liquid particles 14 can be water or any other suitable conductive or non-conductive liquid or combination of liquids, as desired. Also, the non-uniform fields 26 can be created by suitably interconnecting the electrodes 23 and/or 22 to a direct current source or alternating current source of any suitable voltage.

While an arcuate path of non-uniform fields 26 and a cylindrical carrier drum 20 therefor has been illustrated and described, it is to be understood that the non-uniform field path could be straight or any other desired configuration with the web 11 being carried on any suitable carrier or being passed through such non-uniform field path without a carrier, as desired. Further, while only one drum 20 is illustrated, a plurality of drums 20 could be utilized with such drums 20 being in series or alternating with non-electrostatic "cans" as desired.

Also, it is to be understood that while the rows 24 and 25 of electrodes 22 and 23 are illustrated in FIG. 1 as being spaced from the opposed sides of the web 11 a considerable distance, one or both of the rows 24 and 25 of electrodes 22 and 23 could be disposed closer or farther away from the web 11 than as illustrated, as desired. Further, the length of each electrode 22 or 23 could be shorter or longer than as illustrated. In fact, the smaller electrodes 23 could each be a fine wire disposed laterally to moving web 11. Thus, it can be seen that the non-uniform fields 26 could be uniform in the appearance thereof from inlet roller 17 to the outlet roller 18 or could be any arrangement of large, small, etc. as they extend around the periphery of the drum 20 with some or all of the electrodes 22 and 23 being spaced from the web 11 different distances, as desired.

Thus, it can be seen that the rows 24 and 25 of electrodes 22 and 23, in effect, define a passage means having an inlet adjacent the guide roller 17 and an outlet adjacent the guide roller 18 so that the web 11 is passed through the inlet of such passage defining means to have the electrostatic action of the alternating non-uniform electrostatic fields act thereon whereby it is believed that by the time the web 11 reaches the outlet, at least some of the liquid particles 14 will be removed from the web 11 and/or at least some of the liquid particles 14 will be moved relative to the web as illustrated in FIG. 3 to provide a "bonus effect" which will improve upon the efficiency of the conventional drying section 33 in removing the liquid 14 from the material 11.

While the method and apparatus 10 has been previously described as operating with the inner row 24 of large and small electrodes 22 and 23 being stationary during the rotation of the drum 20, it is to be understood that the inner row 24 of electrodes 22 and 23 could rotate in unison with the drum 20 by forming part of the outer periphery 19 thereof or rotate independently of the movement of the drum 20 in either a clockwise or counterclockwise direction as desired by being carried on a drum separate from the drum 20.

In this manner, the electrostatic field pattern being created between the outer stationary row 25 of electrodes 22 and 23 and the moving inner row 24 of electrodes 22 and 23 would repetitively change from the non-uniform configurations 26 illustrated in FIG. 1 to the uniform field configurations 26' of FIG. 5 and then back to the non-uniform field arrangements 26 of FIG. 1 changing infinitely to the uniform field arrangement 26' of FIG. 5 and then changing infinitely back to the non-uniform field arrangement 26 of FIG. 1.

It might be found that the changing electrostatic field pattern between the non-uniform field arrangement 26 of FIG. 1 and the uniform field arrangement 26' of FIG. 5 has a greater effect for moving the moisture particles 14 toward the outer surfaces 15 and 16 of the web fibrous material 11 than just when the constant action of the non-uniform fields 26 is imposed thereon as previously described in connection with the operation of FIG. 1.

While the arrangement of FIG. 5 shows the electrostatic fields being formed uniform through the movement of the inner row 24 of electrodes 22 and 23 relative to the outer row 25 of electrodes 22 and 23, it is to be understood that the outer row 25 of electrodes 22 and 23 could be moved relative to the inner row 24, whether or not the inner row 24 is also movable or stationary as desired, whereby the resulting effect would still be a repetitively changing electrostatic field pattern between non-uniform fields and uniform fields for the reasons previously set forth.

While the method and apparatus 10 of this invention has been previously described as having all of the electrodes 22 and 23 in the inner row 24 provided with one like charge thereon and all of the electrodes 22 and 23 in the outer row 25 being provided with a like charge opposite to the charge on the inner row 24, it is to be understood that the non-uniform fields 26 could be provided by having all of the small electrodes 23 in both of the rows 24 and 25 of a like charge and all of the large electrodes 22 in the inner and outer rows 24 and 25 with a like and opposite charge as illustrated in FIG. 4. With such an arrangement, it might only perhaps be necessary to provide electrically insulating barriers 27 between adjacent electrodes 22 and 23 in each row 24 and 25 as illustrated in FIG. 4 to prevent adverse field action between adjacent electrodes 22 and 23 in the same row 24 or 25 thereof.

In this manner, all of the non-uniform fields 26 will have the intense portions thereof adjacent the smaller electrodes 23 of a like charge so that if the moisture particles 14 in the web of wet fibrous material 11 are more readily attracted toward the negative charges as illustrated in FIG. 4, then the movement of the moisture particles 14 toward the outer surfaces 15 and 16 of the web of material 11 would be greater by having the small electrodes 23 in both rows 24 and 25 provided with the desired negative charge thereon as illustrated rather than having the small electrodes 23 in either row 24 or 25 of FIG. 1 with positive charges thereon.

Of course, the arrangement of FIG. 4 could have the electrodes 22 and 23 being charged by alternating current rather than direct current so that all of the small electrodes 22 would first have a positive charge thereon and then have a negative charge thereon in a repetitive manner as provided by alternating current.

In fact, it may be found that when utilizing alternating current for any of the electrode arrangements of this invention, the same could be alternated with a high enough frequency that would place the same into a dielectric heating range for the dual benefit of attracting the particles 14 outwardly by electrostatic field forces as well as causing the particles 14 to be blown outwardly by the exploding steam created in the center section of the wet web of material 11 through the dielectric heating of the center moisture particles 14 thereof as fully disclosed in the aforementioned U.S. Pat. No. 3,966,575.

Also, it is to be understood that uniform electrostatic fields 26' of any desired length or combination of lengths could be disposed intermediate the non-uniform electrostatic fields 26 as illustrated in FIG. 6 to produce a desired pulling or pushing effect on the particles 14 in the web 11 as the same is passed therethrough in a manner similar to the embodiment of FIG. 5 as previously described.

While it is believed that the thickness of the material 11 could range anywhere between relatively thick ceiling tile sheets of fibrous material 11 down to paper thickness, it is to be understood that the web fibrous material 11 could be thicker than ceiling tile or thinner than paper, as desired.

Also, while the various electrostatic arrangements have been previously described as operating on wet web like fibrous material, it is to be understood that the same could operate on other material, such as fluid, etc., as desired.

In addition, it may be found that it is desired to sonically or ultrasonically vibrate the fibrous web 11 during the same time that the web 11 is being acted upon by the non-uniform fields 26 whether the non-uniform fields 26 are static and constant or oscillating, such as by having the electrodes 22 and 23 interconnected to an alternating current source. In fact, it may be desired that the non-uniform fields 26 are oscillated by having the electrodes 22 and 23 interconnected to a high intensity, high frequency modulating electric source to simultaneously dielectrically heat the liquid particles 14 in the web of material 11 at the same time the same is being sonically or ultrasonically vibrated for the reasons fully disclosed in the aforementioned U.S. Pat. Nos. 3,966,575 and 3,965,581. Also see U.S. Pat. No. 3,999,302.

In particular, the embodiment of the method and apparatus 10 of this invention as illustrated in FIG. 1 can include a plurality of sonic or ultrasonic field wave creating horns 34 to respectively create vibrations in the outer and opposed sides 15 and 16 of the web of material 11 as the web 11 passes through the non-uniform fields 26, such horns 34 at least being located where any dielectric heating action is taking place to change the moisture particles 14 to steam or being disposed completely along the web of material 11 as the same progresses from the inlet roller 17 to the outlet roller 18, as desired.

In any event, it is believed that the vibration of the outer opposed layers of the web of material 11 will reduce the friction of the fibers thereof to the outwardly moving moisture particles 14 whether the liquid particles 14 are being attracted outwardly by the non-uniform fields 26 in the manner previously described or being blown outwardly by the central moisture particles 14 turning to steam through the dielectric heating thereof should the non-uniform fields 26 be oscillated with a high frequency to cause such dielectric heating of the moisture particles 14 whereby the "bonus effect" is believed to be increased by the increase in the flowability of the moisture particles 14 outwardly through the outer layers of the strip of material 11.

In fact, it may be found that the sonic or ultrasonic vibration of the moisture particles 14 in the outer layers of the strip of material 11 as the same passes through the non-uniform fields 26 will cause a mechanical dielectric heating of the moisture particles 14 in at least the outer layers thereof because the outer layers of the strip of material 11 will be vibrated at a greater rate than the inner layers of the strip of material 11 since it is believed that the vibrating waves progressively dissipate as the same progressively penetrate inwardly into the material 11.

However, it is believed that the mechanical movement of the moisture particles 14 will cause the same to be in different positions relative to the lines of force of each particular non-uniform field 26 to cause a change in the alignment of the electrons of the moisture particle and thereby cause the moisture particle to partially rotate even if the particular field 26 acting thereon is static and constant rather than being oscillated. Of course, if the particular field 26 is oscillated, the partial rotation of each moisture particle 14 passing therethrough by the change of its position in the non-uniform field 26 by vibration augments the oscillating action of the moisture particle 14 through the oscillating field 26 itself.

For example, it can readily be seen from FIG. 2 that the electric field lines of force 28 of a particular non-uniform field 26 illustrated therein have been superimposed upon the strip of material 11, such field 26 being created between a small electrode 23 and a large electrode 22.

In this manner, a particle of liquid 14 being carried through the field 26 along the line 31 from a point 29 on the outer extreme field force line 28A of the field 26 to the point 30 on the other extreme field line 28B of the particular non-uniform field 26 will be vibrated upwardly and downwardly, such as along the line 32 illustrated in FIG. 2, so that the liquid particle 14 will have the angle of the field force lines 28 changed thereon as that particular particle 14 progresses through the non-uniform field 26.

Therefore, it is believed that a mechanical dielectric heating action will take place on the moisture particles 14 through the sonic or ultrasonic vibration thereof with the particles 14 in the outer layers thereof being dielectrically heated at a greater rate than the moisture particles 14 in the inner layer of the material 11 because of the believed to be dissipation of the vibrating waves as they progressively penetrate into the material 11.

Conversely, should the non-uniform fields 26 be oscillated with a high frequency, high intensity electric current, it is believed that the moisture particles 14 in the inner layer of the web 11 will be more readily heated and changed to steam by such oscillating electric fields 26 than the moisture particles 14 in the outer layers because the moisture particles 14 in the outer layers readily dissipate their heat to the surrounding atmosphere.

Thus, it may be found that there is a heat leveling factor created through the combination of the dielectric heating operation and the vibrating action so that all of the moisture particles 14 throughout the entire cross sectional thickness of the web 11 will be heated at least to the same degree and in fact, the moisture particles 14 in the outer layers may be even heated to a greater degree when adding the effect of the mechanical vibration thereof and the oscillating electric fields thereon.

Accordingly, it can be seen that it is believed that by vibrating the fibrous sheet 11 in the angled field force lines 28 of the non-uniform fields 26 during the operation of the apparatus 10, it will cause the moisture particles 14 to be mechanically moved back and forth across the angled field force lines 28 at a very rapid rate so that such change in the direction of the field force lines 28 on each moisture particle 14 will cause the same to be dielectrically heated mechanically and if the fields 26 themselves are also being oscillated with a high frequency electric current, an increase in the dielectric heating action of the moisture particles 14 might take place over the rate of dielectric heating thereof if the vibration action did not take place and only the oscillating electric fields 26 were provided.

In this manner, it may be found that since a greater total dielectric heating action is produced through the combination of vibrations and the high frequency electric oscillating fields 26 on the moisture particles 14 in the outer layers of the web 11 than in the inner layer thereof, less total electric energy may be required to be utilized or the fields 26 may not be required to be oscillated with as high a frequency and/or intensity since not only are the moisture particles 14 being more readily dielectrically heated, but also the increased flowability of the moisture entrained particles out through the outer layers by the exploding steam in the manner previously described may also permit less use of total energy.

Also, it may be found that the same high frequency electric source for operating the electric fields 26 for producing the dielectric heating operation can also be the source for operating the vibratory means 34 whereby the total cost for both operations in this invention might be less than each being completely separate and then added together.

While the vibration producing horns 34 are illustrated in FIG. 1 to provide the vibrating action on the web 11, it is to be understood that direct engagement of the web 11 could take place. For example, the drum 20 could have its outer periphery 19 or selected parts thereof vibrated to impart vibration to the web 11 as desired.

Also, some or all of the electrodes that provide the dielectric heating action could directly engage the web 11 and such engaging electrodes, whether insulated or uninsulated, could be sonically or ultrasonically vibrated to provide the dual function of dielectrically heating and vibrating the web 11, such as in the manner disclosed and claimed in the aforementioned U.S. Pat. No. 3,999,302. Thus, if some or all of the electrodes for dielectric heating are also vibrated and the same source of high frequency electric energy is utilized to create the oscillating field action and the vibrating action, the resulting cost of combining such two actions could be reduced over the cost of providing the two actions with separate equipment. In fact, it may be found that only few engaging electrodes in the steam creating area of the traveling web need be vibrated to provide for the hoped for previously described advantageous results.

While this present disclosure has stressed the use of non-uniform fields of an alternating arrangement, it is to be understood that it is believed that conventional dielectric heating arrangements could be augmented or enhanced by using vibratory action in combination therewith for any of the reasons previously set forth.

Also, while the various embodiments of this invention as previously described have each been provided with an inner row of electrodes 24 either forming part of the rotatable drum or be separate therefrom while being disposed inside the outer periphery 19 thereof, it is believed that by merely providing an electrode arrangement adjacent a heated surface with that surface either being electrically conductive or provided with an electric insulating coating thereon while being electrically conductive beneath such coating, the outer electrode arrangement can cooperate with the heated surface to define a plurality of alternate arranged non-uniform electric fields extending between the electrode arrangement and the surface with each non-uniform field having the higher intensity portion thereof substantially oppositely located relative to the higher intensity portion of an adjacent non-uniform field so that the fields can at least partially extend through a material disposed against the surface and between the surface and the electrode arrangement.

For example, such a method and apparatus is illustrated in FIG. 7 wherein the drum 20 comprises a conventional paper-making drying drum of the "can" or "yankee" configuration and having an outer heated peripheral surface 19 against which the material 11 rotates therewith to be dried thereby. However, an electrode arrangement of this invention comprising a plurality of large electrodes 22 and small electrodes 23 of the type previously described are arranged in a circular array adjacent the outer periphery 19 of the drum 20 to cooperate with the conductive portion of the drum 20, whether the conductive portion forms the outer periphery 19 thereof or is disposed beneath the outer periphery 19 if the outer periphery 19 is formed of electrically insulating material. It is believed that the charged electrodes 22 and 23 will still form the non-uniform fields 26 in the alternately arranged manner illustrated in FIG. 7 because the conductive portion of the drum 20 will be in a grounded condition thereof and cooperate with charged electrodes 22 and 23 through induction to form the non-uniform fields 26 as illustrated.

For example, it is believed that the small electrodes 23 create such an intense field arrangement that the same will draw from larger areas of the drum 20 than the areas attracted by the large electrodes 22.

Accordingly, it can be seen that already existing dryer drums can be modified by merely disposing a row of large and small electrodes 22 and 23 about the outer periphery thereof in the manner illustrated in FIG. 7 and charging those electrodes, either all with one charge or with the large electrodes 22 having one potential and the electrodes 23 having another potential (whereby insulators may need to be disposed between adjacent electrodes 22 and 23 in the manner provided by the insulators 27 of FIG. 4) and the grounded drum 20 will cooperate therewith to provide the non-uniform fields 26 which will pass through the material 11 as the material 11 rotates with the drum 20. Of course, the drum 20 could be stationary and the material 11 can be merely moved over the drum 20, if desired.

In any event, it is believed that the non-uniform fields 26 disposed in the alternately arranged position illustrated in FIG. 7 will augment the drying effect of the drum 20 on the material 11 for all or at least some of the reasons previously set forth as the material 11 moves through the fields 26. Of course, the electrodes 22 and 23 could also be moving relative to or with the material 11 rather than be stationary as illustrated in FIG. 7.

Also, the electrodes 22 and 23 could be electrically insulated or uninsulated and the drum periphery could be electrically insulated or uninsulated as it is believed that the non-uniform fields 26 will still be created by charging the electrodes 22 and 23 even though the drum 20 is at ground potential and the periphery 19 thereof is insulated and the electrodes 22 and 23 are insulated. In addition, it may be found that it is desirable to have all or some of the electrodes 22 and 23 actually engage the material 11 during the drying thereof.

Further, it can be seen that the drum 20 could be vibrated and/or the material 11 could be vibrated by air horns or engagement means as desired for the reasons previously set forth at the same time the fields 26 are acting on the material 11.

Also, while the various embodiments of this invention as previously described have each been provided with an electrode arrangement of alternating large and small electrodes 22 and 23, it is believed that by merely providing an electrode arrangement of spaced apart small electrodes 23 adjacent a heated surface with that surface either being electrically conductive or provided with an electric insulating coating thereon while being electrically conductive beneath such coating, the outer electrode arrangement can cooperate with the heated surface to define a plurality of spaced apart non-uniform electric fields extending between the electrode arrangement and the surface so that the fields can at least partially extend through a material disposed against the surface and between the surface and the electrode arrangement.

For example, such a method and apparatus is illustrated in FIG. 8 wherein the drum 20 comprises a conventional paper-making drying drum of the "can" or "yankee" configuration and having an outer heated peripheral surface 19 against which the material 11 rotates therewith to be dried thereby. However, an electrode arrangement of this invention comprising a plurality of small electrodes 23 of the type previously described and alternately charged are arranged in a circular array adjacent the outer periphery 19 of the drum 20 to cooperate with the conductive portion of the drum 20, whether the conductive portion forms the outer periphery 19 thereof or is disposed beneath the outer periphery 19 if the outer periphery 19 is formed of electrically insulating material. It is believed that the alternately charged electrodes 23 will form the non-uniform fields 26 in the spaced apart manner illustrated in FIG. 8 because the conductive portion of the drum 20 will be in a grounded condition thereof and cooperate with the alternately charged electrodes 23 through induction to form the non-uniform fields 26 as illustrated.

Accordingly, it can be seen that already existing dryer drums can be modified by merely disposing a row of small electrodes 23 about the outer periphery thereof in the manner illustrated in FIG. 8 and alternately charging those electrodes (however, insulators 27 may need to be disposed between adjacent electrodes 23 in the same manner and for the same reasons provided by the insulators 27 of FIG. 4) and the grounded drum 20 will cooperate therewith to provide the spaced apart non-uniform fields 26 which will pass through the material 11 as the material 11 rotates with the drum 20. Of course, the drum 20 could be stationary and the material 11 can be merely moved over the drum 20, if desired.

In any event, it is believed that the alternately directed non-uniform fields 26 disposed in the arranged position illustrated in FIG. 8 will augment the drying effect of the drum 20 on the material 11 for all or at least some of the reasons previously set forth as the material 11 moves through the fields 26. Of course, the electrodes 23 could also be moving relative to or with the material 11 rather than be stationary as illustrated in FIG. 8.

Also, the electrodes 23 of FIG. 8 could be electrically insulated or uninsulated and the drum periphery 19 could be electrically insulated or uninsulated as it is believed that the non-uniform fields 26 will still be created by charging the electrodes 23 even though the drum 20 is at ground potential and the periphery 19 thereof is insulated and the electrodes 23 are insulated. In addition, it may be found that it is desirable to have all or some of the electrodes 23 actually engage the material 11 during the drying thereof.

Further, it can be seen that the drum 20 of FIG. 8 could be vibrated and/or the material 11 could be vibrated by air horns or engagement means as desired for the reasons previously set forth at the same time the fields 26 are acting on the material 11.

In any event, it is presently believed that the alternately charged electrostatic field arrangements of FIGS. 4 and 8 will produce a more rapid drying rate than the electrostatic field arrangements where all of the electrostatic fields are charged in the same direction, such as in FIG. 1.

In particular, it is believed that when a moisture or liquid particle is being carried on or in a web of material and is being passed through a plurality of spaced-apart substantially constant and non-current consuming electrostatic fields disposed in a heating means and which are created by a plurality of spaced parallel electrodes disposed transverse to the direction of travel of the web and each being charged with the same polarity, each being spaced from one side of the moving web and each cooperating with other electrode means disposed on the other side of the moving web, that particle of liquid when entering one of those electrostatic fields will be subjected to an outward pulling or pushing action toward the charged electrode or away from the charged electrode, such distortion or working of the liquid particle against the fibers of the web of material 11 increasing its surface area, etc. to increase the heat transfer rate thereto. When that particle of liquid leaves that electrostatic field and enters into a non-field area, (or a weaker electrostatic field area) prior to entering into the next electrostatic field, the previously distorted particle of liquid will tend to relax and return to its non-field influenced shape before that liquid particle is again subjected to the pulling or pushing action as it enters the next electrostatic field. Thus, it is believed that this rapid pumping or pulsing action by the electrostatic fields on that liquid particle will increase the drying rate thereof in the particular heating means containing the electrostatic field arrangement.

However, it may be found that if the particle of liquid is moved through such electrostatic field arrangement in too rapid a manner, the particle of liquid will not have time to recover from the outward pushing or pulling action of one of the electrostatic fields before it enters into the next electrostatic field so that the pulsed distortion of that liquid particle passing through the plurality of electrostatic fields would not be as great as when that liquid particle is moved at a slower rate through that electrostatic field arrangement in order to permit the liquid particle to completely relax from its previously distorted condition caused by the electrostatic field that it just left and prior to entering the next electrostatic field. This theory is based on the assumption that an electrostatic field causes an immediate movement or distortion of the liquid particle when the liquid particle moves into that electrostatic field whereas a return of that distorted liquid particle to a non-field influenced condition thereof is at a slower rate caused only by the surface tension of the distorted liquid particle.

Thus, it would seem to follow that if each electrostatic field acted in an opposite direction on that liquid particle from the direction that the previous electrostatic field acted thereon, there would be no problem as to the speed of movement of that particle of liquid through the fields because that particle of liquid would be distorted in one direction by the next electrostatic field regardless of whether or not the liquid particle returned to its normal condition between such electrostatic fields as the electrostatic fields themselves will force that liquid particle to pass through the normal condition thereof from its distorted condition in one direction to the distorted condition thereof in the opposite direction thereof.

Also, in the arrangement where the electrodes are all charged with the same polarity on the same side of the traveling web of material, each distortion caused by an electrostatic field is in only one direction whereas with the alternately charged electrostatic field arrangement, not only is the advantage of the pulse on the liquid particle being in one direction being provided, but also the next pulse is in the opposite direction so that it would seem that the amount of distortion (or working) of each particle of liquid would be at least double in the alternately charged electrostatic field arrangement and would happen in a much more rapid manner than can be provided by having all of the electrodes on one side of the web of material of the same polarity. Thus, it might be found that the increase in the heat transfer rate with the alternately charged electrostatic field arrangement is double the rate when all of the electrodes have the same polarity and the spacing between adjacent electrodes in both arrangements are the same. Also, since it is not necessary to have a non-field area (or a weaker electrostatic field area) between each pair of alternately charged electrostatic fields as is required between each pair of like charged electrostatic fields in order to have maximum pulsing, the number of alternately charged electrostatic fields per running foot can be greater than the number of like charged electrostatic fields whereby the number of pulses in the alternately charged electrostatic field arrangement will be greater than the number of pulses in the like charged electrostatic field arrangement per running foot thereof.

Because adjacent electrodes would be oppositely charged in the alternately directed electrostatic field arrangement, it is believed that it would be necessary to provide insulating barriers between each pair of adjacent electrodes so that those adjacent electrodes could be spaced closer together than would be the case if such barriers were not utilized whereby a greater number of oppositely directed electrostatic fields could be provided per running foot with barriers than without barriers. For example, if the electrodes are to be spaced about one inch from one side of the moving web and about two inches apart, each insulating barrier could be disposed medially between each adjacent pair of electrodes and extend from a point outboard of the electrodes to about one-quarter of an inch from the one side of the moving web that faces the electrodes.

Thus, since the speed of a paper making machine is about 3000 feet per minute and six such oppositely charged electrostatic fields could be provided for each running foot thereof in the above example, the pulse rate created by those oppositely charged electrostatic fields on each liquid particle would be approximately 300 times per second and such pulsing action takes place without any energy being used to pulse such fields as the pulsing is created merely by the rapid movement of the web through a plurality of substantially constant and non-current consuming electrostatic fields. And it is believed that each pair of adjacent pulses on each liquid particle in the alternately directed electrostatic field arrangement will at least distort or work that liquid particle by twice the amount than can be provided when like charged electrostatic fields are being utilized.

An added advantage of the alternately charged electrostatic fild arrangement might be that any adverse ions being created in the atmosphere adjacent each charged electrode will be cancelled out by oppositely charged ions being created at the charged electrodes disposed adjacent thereto whereas all of the ions being created by the electrodes of the like charged electrostatic field arrangement will be of the same polarity.

It is believed that the electrostatic fields in the alternately directed or charged arrangement can each be uniform or each be non-uniform or the fields in the arrangement can be various combinations of uniform and non-uniform fields. Also, it is believed that the insulating barriers between adjacent and alternately charged electrostatic fields can shape such electrostatic fields to the desired shapes thereof for improved augmentation and more than one barrier between adjacent electrodes can be utilized for such reshaping of the electrostatic fields, if desired.

The above theories about the alternately directed and oppositely charged electrostatic fields having a greater heat transfer rate effect in a heating means over the heat transfer rate of like charged electrostatic fields utilized in the same heating means is based on the fact that it has been found from the article, "Direct-Contact Heat Transfer To Drops In An Intermittent Electric Field" at pages 165–170 of Volume 3 of the 1978 "Proceedings Of The Sixth International Heat Transfer Conference," that the heat transfer rate between a drop of one liquid moving through another liquid is increased if a transverse electrostatic field is imposed across the path of travel of the moving drop in the other liquid and that the heat transfer rate will be further increased if the transverse electrostatic field is intermittently applied at certain frequencies to cause the drop to distort or elongate in the direction of the field each time it is applied and then return to its normal spherical shape each time the field is dissipated. Also see the article by certain of the same authors at pages 32–37, of Volume 102 of the February 1980, *Transaction of the ASME* and entitled "Augmentation of Direct-Contact Heat Transfer to Drops with an Intermittent Electric Field."

However, it is to be understood that the above set forth theories of the improved drying function of the electrostatic fields of this invention is not to be a limitation on this invention as the theories are merely set forth as a possible explanation as to how such uniquely arranged electrostatic fields of this invention might function to augment the drying rate of heating means and the like.

It is believed, according to the teachings of this invention, that the previously described electrostatic fields might be improved in their augmentation of the heat drying of wet material if those electrostatic fields were changed or reshaped from the normal shapes thereof to shapes which would increase the electrostatic pumping or pulsing action on the liquid particles of the wet material.

For example, the insulating barriers 27 of FIG. 4, in effect, comprise means disposed between each pair of adjacent electrostatic fields 26 and change the normal shape of those adjacent electrostatic fields 26 between the electrode means 23, 22 and the material 11 so that when the material 11 is moved in one direction, the particles of liquid of a portion of that material 11 serially move through the thus reshaped electrostatic fields while the portion of the material 11 is being heated by the heating means 20 because if the barriers 27 were not utilized in the embodiment of FIG. 4, each field 26 would be influenced by the adjacent oppositely charged electrodes. Thus, it is believed that the barriers 27 enhance the action of the fields 26 on the material 11 by changing the shape of the fields 26 from the normal conditions thereof, if the barriers 27 were not disposed between adjacent electrostatic fields 26, to shapes thereof that concentrate the field force lines on the material 11 in a more effective manner to work the particles of liquid.

Such feature is also provided by the barriers 27 illustrated in FIG. 8 and as described for the embodiment of FIG. 7.

It may be found that it is desirable to utilize more than one insulating barrier 27 between adjacent electrostatic fields 26 and such an arrangement is illustrated in the FIG. 9.

In particular, it can be seen in FIG. 9 that the electrodes 23 cooperate with the outer periphery 19 of the heated drum 20 to define a plurality of non-uniform electrostatic fields 26 and that two insulating barriers 27 are respectively disposed between each pair of adjacent electrodes 23 to not only reshape the normal shape of the fields 26 for the reasons previously set forth, but also to provide a generally non-field area, that is generally indicated by the reference numeral 40 in FIG. 9, between each pair of adjacent electrostatic fields 26 to insure the maximum pulsing of each particle of liquid passing therethrough should all of the electrodes 23 be provided with a like charge for the reasons previously set forth. Of course, the electrodes 23 of FIG. 9 can be alternately charged as in FIG. 8.

While the barriers 27 are illustrated as being substantially radially disposed relative to the axis of rotation of the drum 20, it is to be understood that the barriers 27 could be angled in any manner to provide the desired shape for the fields 26 in a manner to maximize their action on the particles of liquid carried by the material 11.

Also, such barriers 27 could take any desired shape.

For example, reference is made to FIG. 10 wherein the insulating barriers disposed between adjacent electrostatic fields 26 created by the electrodes 23 and outer periphery 19 of the heated drum 20 comprises rollers 41 of electrically insulating material that actually engage and rotate against the outer surface 42 of the material 11, a pair of rollers 41 being disposed between adjacent electrostatic fields 26 to provide the non-field areas 40 therebetween as previously set forth.

Also, as previously set forth, the various features of this invention are not to be limited to only the heat drying provided by a heated drum 20 because it is obvious that the various features of this invention can be utilized to provide electrostatic fields for acting on the liquid particles of wet material as that wet material is passed through other types of heating means, such as air heating means, to augment the drying effect of that heating means in drying the material passing therethrough.

For example, reference is now made to FIG. 11 wherein the strip of wet material 11 is adapted to be moved from left to right through a heating apparatus that is generally indicated by the reference numeral 43 and is adapted to direct heated air against the upper side 44 and/or lower side 45 of the strip of material 11 as the same passes through the apparatus 43 in a manner conventional in the art to dry the material 11. However, a plurality of electrodes 23 are disposed in spaced relation on opposite sides 44 and 45 of the strip of material 11, extend across the width thereof and cooperate with like electrodes 23 on the opposite side of the material 11 to provide a plurality of non-uniform electrostatic fields 26 which serially act on the liquid particles of the material 11 as the same pass therethrough in the manner previously described while the material 11 is being heated by the heated air being directed thereto by any suitable apparatus (not shown).

As illustrated in FIG. 11, the electrodes 23 can be disposed in a staggered manner so as to be alternately placed closer and further away from the respective side 44 or 45 of the material 11 as illustrated. Also, each field 26 could be like directed by serially having one of the electrodes 23 on the side 44 of the material 11 provided with a positive charge while its cooperating electrode 23 on the side 45 of the material 11 is provided with a negative charge while the next adjacent electrostatic field 26 also has a positive charge on the electrode 23 on the side 44 of the material 11 so that all of the electrodes 23 on the side 44 of the material 11 would have a like charge and all of the electrodes 23 on the other side 45 of the material 11 would have a like and opposite charge. However, if desired, each field 26 could be oppositely directed by having one electrode 23 on the side 44 of the material 11 provided with a positive charge and then the next electrode 23 on that side 44 of the material 11 being provided with a negative charge whereby the electrodes 23 on the side 44 of the material 11 would be alternately charged in a serial manner while the cooperating electrodes 23 on the other side 45 of the material 11 would likewise be alternately charged.

In any event, it can be seen that a plurality of insulating barriers 27 are disposed between each pair of electrostatic fields 26 in FIG. 11 to change the shape thereof from the normal shape thereof should the barriers 27 not be provided and the electrodes 23 would be free to cooperate with adjacent electrodes 23 to create electrostatic fields of a different and normal shape.

Thus, it can be seen that the two barriers 27 disposed between each pair of adjacent fields 26 on the respective side 44 or 45 of the material 11 change the shape of the fields 26 from the normal shapes thereof in order to provide for improved electrostatic fields 26 as well as to provide for non-field areas 40 between adjacent electrostatic fields 26 for the reasons previously set forth.

Of course, the barriers 27 can take any form to provide such function.

For example, insulating rollers 41 are utilized in FIG. 12 to not only reshape the electrostatic fields 26, but also to provide the non-field areas 40 therebetween, the rollers 41 actually engaging the sides 44 and 45 of the material 11 and extending laterally across the width of the material 11. In addition, it can be seen that the electrostatic fields 26 are provided by the electrodes 23 being equally spaced from the respective side 44 or 45 of the material 11 although the same could be staggered in the manner illustrated in FIG. 11 if desired. Also, such electrodes 23 can directly engage the material 11 if desired.

While the various embodiments of this invention previously described and illustrated have the electrodes providing the electrostatic fields by, in essence, having one electrode on one side of the material and a cooperating electrode on the other side thereof, it is to be understood that the various features of this invention can be provided by merely disposing the cooperating electrodes on the same side of the material while still providing electrostatic fields which will function in the manner previously set forth to augment the heat drying of the material as the material passes through the electrostatic fields in the heating apparatus containing the electrostatic field means.

For example, reference is made to FIG. 13 wherein the material 11 is passing through a heating apparatus 43 from left to right and a plurality of electrodes 23 are disposed in spaced relation to the side 45 of the material 11 while the material 11 is being heated by heated air being directed against the material 11 on the side 44 and/or on the side 45 thereof as desired.

The electrodes 23 in FIG. 13 are oppositely charged in an alternating manner as illustrated in FIG. 13 to create a plurality of electrostatic fields 26.

For example, it is believed that each field 26 would extend from a particular electrode 23 to a point midway between that electrode 23 and the electrode 23 to the left thereof as well as to a point midway between that electrode 23 and the electrode 23 to the right thereof as represented by the dimension arrow 46 in FIG. 13.

In this manner, as the material 11 moves from left to right through the electrostatic fields 26 as represented by the arrows 46, the particles of liquid thereof serially move through an electrostatic field that has its positive portion adjacent the material 11 and then into the next electrostatic field where the electrostatic field 26 has its negative portion adjacent the material 11 in a serial and repetitive manner to provide the alternate pumping or pulsing action previously described so that non-field areas need not be disposed between adjacent electrostatic fields 26 to provide the improved action of the electrostatic fields 26 of this invention for augmenting the heat drying effect on the particles of liquid of the material 11 as the same pass through the heating apparatus.

Of course, it is to be understood that the electrostatic fields 26 of the embodiment illustrated in FIG. 13 can be further enhanced by disposing means between adjacent electrostatic fields 26, such as the insulating rollers 41 illustrated in FIG. 14 whereby the rollers 41 change the shape of the fields 26 in a manner believed to further enhance their action on drying the wet web 11 as the same passes from left to right through the heating apparatus 43 for the reasons previously set forth.

Therefore, it can be seen that in the embodiments illustrated in the FIGS. 9–14, as well as in the embodiments illustrated in FIGS. 4, 7 and 8 wherein the insulating barriers 27 are being utilized, an improved method for drying material is provided and comprises the steps of disposing the material in a heating means to have the heating means heat at least part of the liquid particles of the material, disposing charged electrode means so as to be adjacent one side of the material when the material is disposed in a heating means and to define plurality of electrostatic fields that are serially arranged in substantially a like repeating pattern and that are substantially constant and non-oscillating so that the fields at least partially extend through the material when the material is disposed in the heating means, moving the material in one direction through the heating means to cause at least a portion of the material to have the particles of liquid thereof serially moved through the electrostatic fields while the portion of the material is being heated in the heating means whereby the electrostatic fields augment the drying effect of the heating means on the material, and disposing means between each pair of adjacent electrostatic fields to change the normal shape of the adjacent electrostatic fields between the electrode means and the material so that when the material is moved in the one direction, the particles of liquid of the portion serially move through the thus reshaped electrostatic fields while the portion of the material is being heated by the heating means.

Also, it can be seen that the barriers 27 in FIG. 4, as well as in FIGS. 9, 10, 11 and 12, provide a generally non-field area between each pair of adjacent electrostatic fields whereby the electrostatic fields are spaced apart by the non-field areas so that when the material is moved in one direction, the portion of the material will have the particles of liquid thereof serially moved through an electrostatic field into a non-field area and then into the next electrostatic field in a repetitive manner whereby the particles of liquid of the portion of the material are subjected to a pumping action by the thus spaced apart substantially constant and non-oscillating electrostatic fields while the portion of the material is being heated by the heating means.

Of course, it is to be understood that alternating current can be utilized to alternately charge the electrodes 23 and/or 22 of this invention if desired but that such an arrangement would be current consuming and not non-current consuming as would be the case if direct current were merely utilized. Thus, with direct current it is believed that the fields 26 will be non-current consuming and thereby be constant or non-oscillating fields 26 whereas with alternating current it is believed that the fields 26 will be current consuming as the fields 26 would be non-constant or oscillating fields 26.

In addition, while the insulating barriers 27 of FIGS. 9 and 11 are shown as pairs of members between adjacent electrodes 23, such pairs of barriers 27 could actually be nozzle means through which heated or unheated air or other fluid could be directed against the respective side of the material 11 in the manner represented by the arrows 50 in FIGS. 9 and 11 to impinge against the material 11 and then flow away from the same in the manner represented by the arrows 51 in FIGS. 9 and 11. Of course, if such fluid is heated, then such nozzle means would at least form part of the heating means for the material 11. However, fluid could be directed between the barriers 27 in the manner of the arrows 50 without the barriers 27 being nozzle means, if desired. Also, such air flow 50 could be pulsed to vibrate the material 11 for the reasons previously set forth.

In any event, it can be seen that the fluid flowing between the barriers 27 and, thus, between the free ends of the barriers 27 and the material 11 as represented by the arrows 52 in FIGS. 9 and 11 will keep the material out of contact with the barriers 27, as well as the electrodes 23, in much the same manner as air float systems (or even float the air directing nozzles relative thereto) and it might be found that as the air flows from the material 11 outwardly past the electrodes 23 in the direction of the arrows 51, such air flow 51 will keep the electrodes 23 clean and moisture free by carrying away any particles that might be attracted thereto. Of course, the barriers 27 and electrodes 23 could be arranged in a self-contained unit to be disposed in the desired heating means or apparatus adjacent the material 11 therein, as desired, regardless of whether or not the barriers 27 are utilized with the air flow means 50.

Accordingly, it can be seen that it is believed that this invention provides improved methods and apparatus for drying material and the like.

While the forms and methods of this invention, now preferred, have been illustrated and described as required by the Patent Statute, it is to be understood that other forms and method steps can be utilized and still fall within the scope of the appended claims.

What is claimed is:

1. In a method for drying material comprising the steps of disposing said material in a heating means to have said heating means heat at least part of the liquid particles of said material, disposing charged electrode means so as to be adjacent one side of said material when said material is disposed in said heating means and to define a plurality of electrostatic fields that are serially arranged in substantially a like repeating pattern and that are substantially constant and non-oscillating so that said electrostatic fields at least partially extend through said material while said material is disposed in said heating means, and moving said material in one direction through said heating means to cause at least a portion of said material to have the particles of liquid thereof serially moved through said electrostatic fields while said portion of said material is being heated in said heating means whereby said electrostatic fields augment the drying effect of said heating means on said material, the improvement comprising the steps of disposing nozzle means between each pair of adjacent electrostatic fields, and directing a fluid flow through said nozzle means disposed between each pair of adjacent electrostatic fields so as to impinge against said material.

2. A method as set forth in claim 1 wherein said step of disposing nozzle means between each pair of adjacent electrostatic fields also provides a generally non-field area between each pair of adjacent electrostatic fields whereby said electrostatic fields are spaced apart by said non-field areas so that when said material is moved in said one direction said portion of said material will have the particles of liquid thereof serially moved through an electrostatic field into a non-field area and then into the next electrostatic field in a repetitive manner whereby said particles of liquid of said portion of said material are subjected to a pumping action by the thus spaced apart substantially constant and non-oscillating electrostatic fields while said portion of said material is being heated by said heating means.

3. A method as set forth in claim 1 and including the step of forming said electrostatic fields to each be non-uniform.

4. A method as set forth in claim 3 and including the step of forming said non-uniform electrostatic fields to be alternately arranged with each non-uniform electrostatic field having the higher intensity portion thereof substantially oppositely located relative to the higher intensity portion of an adjacent non-uniform electrostatic field.

5. A method as set forth in claim 1 and including the step of forming said electrode means to comprise a plurality of spaced apart electrodes.

6. A method as set forth in claim 1 and including the step of forming said electrostatic fields to be substantially non-current consuming electrostatic fields.

7. A method as set forth in claim 1 and including the step of heating said fluid before directing said fluid through said nozzle means disposed between each pair of adjacent electrostatic fields whereby the thus heated fluid at least defines part of said heating means.

8. A method as set forth in claim 1 and including the step of forming said nozzle means to change the normal shape of said adjacent electrostatic fields between said electrode means and said material so that when said material is moved in said one direction said particles of liquid of said portion serially move through the thus reshaped electrostatic fields while said portion of said material is being heated by said heating means.

9. A method as set forth in claim 1 and including the steps of forming said electrode means to comprise a plurality of spaced apart electrodes with each electrode creating one of said electrostatic fields, and disposing said nozzle means so as to also be between each adjacent pair of said electrodes.

10. A method as set forth in claim 9 and including the step of causing at least part of said impinged fluid to be directed from said material outwardly toward said electrodes so as to flow against and past said electrodes in a direction away from said material.

11. A method as set forth in claim 5 and including the step of alternately charging said electrodes so that generally each positively charged electrode is disposed between a pair of negatively charged electrodes and each negatively charged electrode is disposed between a pair of positively charged electrodes.

12. A method as set forth in claim 11 and including the step of disposing other electrode means so as to be adjacent the other side of said material when said material is disposed in said heating means and to cooperate with said plurality of electrodes to define said electrostatic fields therewith.

13. A method as set forth in claim 12 and including the step of forming said other electrode means to comprise a plurality of spaced apart electrodes.

14. A method as set forth in claim 13 and including the step of alternately charging said electrodes of said other electrode means so that generally each positively charged electrode thereof is disposed between a pair of negatively charged electrodes thereof and each negatively charged electrode thereof is disposed between a pair of positively charged electrodes thereof.

15. A method as set forth in claim 14 wherein said steps of alternately charging causes each positively charged electrode on its respective side of said material to form its electrostatic field with a negatively charged electrode on the other side of said material and causes each negatively charged electrode on its respective side of said material to form its electrostatic field with a positively charged electrode on the other side of said material.

16. A method as set forth in claim 15 wherein the step of disposing said nozzle means comprises the step of disposing said nozzle means between each pair of adjacent electrodes on each side of said material.

17. A method as set forth in claim 1 and including the step of disposing other electrode means so as to be adjacent the other side of said material when said material is disposed in said heating means and to cooperate with said charged electrode means to define said electrostatic fields therewith.

18. A method as set forth in claim 17 and including the step of forming said charged electrode means to comprise a plurality of spaced apart charged electrodes.

19. A method as set forth in claim 18 and including the step of forming said other electrode means to comprise a plurality of spaced apart electrodes.

20. A method as set forth in claim 19 and including the step of causing each charged electrode to form its electro-static field with an electrode on said other side of said material.

21. A method as set forth in claim 20 and including the step of charging said electrodes on said other side of said material.

22. A method as set forth in claim 21 wherein the step of disposing said nozzle means comprises the step of disposing said nozzle means between each pair of adjacent electrodes on each side of said material.

* * * * *

UNITED STATES PATENT AND TRADEMARK OFFICE
CERTIFICATE OF CORRECTION

PATENT NO. : 4,551,924
DATED : November 12, 1985
INVENTOR(S) : James T. Candor

It is certified that error appears in the above-identified patent and that said Letters Patent is hereby corrected as shown below:

The term of this patent subsequent to September 20, 2000 has been disclaimed.

Signed and Sealed this

Twenty-fourth Day of June 1986

[SEAL]

Attest:

DONALD J. QUIGG

Attesting Officer

Commissioner of Patents and Trademarks